United States Patent
Tachi et al.

(10) Patent No.: US 7,659,502 B2
(45) Date of Patent: Feb. 9, 2010

(54) OPTICAL TACTILE SENSOR

(75) Inventors: Susumu Tachi, Tsukuba (JP); Naoki Kawakami, Tokyo (JP); Hiroyuki Kajimoto, Yokohama (JP); Kazuto Kamiyama, Maebashi (JP); Terukazu Mizota, Yamatokohriyama (JP)

(73) Assignee: Toudai TLO, Ltd., Tokyo (JP)

( * ) Notice: Subject to any disclaimer, the term of this patent is extended or adjusted under 35 U.S.C. 154(b) by 440 days.

(21) Appl. No.: 10/571,370

(22) PCT Filed: Mar. 3, 2005

(86) PCT No.: PCT/JP2005/003650

§ 371 (c)(1),
(2), (4) Date: Mar. 9, 2006

(87) PCT Pub. No.: WO2005/124305

PCT Pub. Date: Dec. 29, 2005

(65) Prior Publication Data

US 2008/0245955 A1 Oct. 9, 2008

(30) Foreign Application Priority Data

Jun. 16, 2004 (JP) .............................. 2004-177786

(51) Int. Cl.
*G06M 7/00* (2006.01)
*H01L 27/00* (2006.01)
*G06F 3/041* (2006.01)

(52) U.S. Cl. ...................... 250/221; 250/208.1; 345/173

(58) Field of Classification Search ................. 250/221, 250/231.1, 216, 226, 208.1, 231.19, 559.44, 250/559.46; 345/173, 175; 356/601, 607; 73/774, 768; 901/33
See application file for complete search history.

(56) References Cited

U.S. PATENT DOCUMENTS

| 4,599,908 A | * | 7/1986 | Sheridan et al. | ........ 73/862.046 |
| 6,909,084 B2 | | 6/2005 | Tachi et al. | ................. 250/221 |
| 2003/0178556 A1 | * | 9/2003 | Tachi et al. | ............ 250/227.11 |

FOREIGN PATENT DOCUMENTS

| JP | 7-67020 | 3/1995 |
| JP | 11-108630 | 4/1999 |
| JP | 11-118625 | 4/1999 |
| JP | 2001-141660 | 5/2001 |
| WO | 02/18893 A1 | 3/2002 |

* cited by examiner

*Primary Examiner*—Georgia Y Epps
*Assistant Examiner*—Don Williams
(74) *Attorney, Agent, or Firm*—Ladas & Parry LLP

(57) ABSTRACT

An optical tactile sensor and an image information integrating method capable of measuring large area force vector distribution are provided. The optical tactile sensor comprises a tactile section comprising a transparent elastic body (1) and a plurality of markers (3, 4) provided therein, and a plurality of imaging devices (6, 6) for obtaining a marker image by photographing the behavior of the markers when an object (5) contacts the tactile face (2) of the transparent elastic body (1). The method comprises a step of obtaining a partial image by photographing the partial regions A, B, C and D of the transparent resilient body (1) using the plurality of imaging devices (6, 6) such that each imaging device (6) has an overlapped photograph region (11), and a step of integrating the partial images obtained by each imaging device (6) such that the identical markers in the overlapped photograph region match.

17 Claims, 11 Drawing Sheets

IMAGING REGION OF CAMERA 1      IMAGING REGION OF CAMERA 2

● BLUE MARKER
○ RED MARKER

● ○ : Force Sampling Points
● : Computational Results used after computation $n_j, m_k$: Movement Vector of Observed Marker $F_i$: Force Vector $n_j, m_k$: Movement Vector of Observed Marker $F_i$: Force Vector

OPTICAL TACTILE SENSOR

FIELD OF THE INVENTION

The present invention relates to an optical tactile sensor, and preferably to a tactile sensor used for obtaining forces applied to a relatively larger area.

BACKGROUND OF THE INVENTION

When considering understanding the contact state of a contact surface using a tactile sensor, there are vectors of three components representing magnitude and direction of force acting at each point of the contact surface. This is represented as f(x,y) in the coordinate system of FIG. 1. Here, f is a vector, and so actually has three components x, y and z at each point. When explicitly expressing each component, it is represented as f(x,y)=[fx(x,y), fy(x,y), fz(x,y)]. Since force distribution has three components at each contact point, in order to reconstruct force distribution for each contact surface using a tactile sensor, it is necessary to acquire information for each contact point on the contact surface with at least three degrees of freedom.

Some of inventors of the present invention et al. have proposed an optical tactile sensor that is capable of measuring three-dimensional force vector distribution. A principle of the optical tactile sensor will be explained based on FIG. 2. The optical tactile sensor comprises a transparent elastic body and a CCD camera. By photographing spherical markers embedded in the transparent elastic body by the CCD camera, internal strain information of the elastic body is measured when a force is applied on the surface of the elastic body, and force vector distribution is reconstructed from the information.

By taking an image of the spherical markers by a CCD camera from z-direction where an elastic body surface is taken as the x-y plane and an orthogonal direction to the x-y plane is taken as the z-axis, movement of a point to be measured when force is applied is measured as a movement vector in the x-y plane. To reconstruct the force vector distribution from the strain information, N×N red spherical markers and blue spherical markers are arranged at different depths in the elastic body as points to be measured to obtain two sets of two-dimensional movement vectors with different depths as two pieces of different information, thereby increasing the amount of information to reconstruct the force vector distribution.

As a use for such an optical tactile sensor, initially, application to a robotic hand of a humanoid robot and so forth is considered, and as an application for an optical tactile sensor, study has focused on a small built-in type sensor. However, such an optical tactile sensor, which is capable of measuring three dimensional force vector distribution and has a sensor surface made of a elastic body, is expected to find application in a variety of fields, not only to a robotic hand.

As one of the expected applications, use of an optical tactile sensor as so called an environmental type tactile sensor can be considered. In this specification, as compared to a built-in type tactile sensor which is incorporated for use into a robotic hand or the like, a tactile sensor which is used in a fixed manner in an environment is referred to as an environmental type tactile sensor. However, with respect to an environmental type tactile sensor, which is used in a fixed manner in an environment, measurement of force distribution over a large area is expected to be necessary because such a sensor is assumed to be applied to, for example, a seating-surface of a chair, a bed, a floor, or the like. This hinders application of a conventional small optical tactile sensor, which is assumed to be incorporated in a robot hand or the like Patent Reference: WO02/188923 A1

An object of the present invention is to provide an optical tactile sensor capable of measuring force distribution over a large area. Another object of the present invention is to provide a marker information acquisition method and a marker image integration method capable of measuring force distribution over a large area. Still another object of the present invention is to provide a force vector reconstruction method employed in an optical tactile sensor capable of measuring force distribution over a large area.

SUMMARY OF INVENTION

The present invention has been conceived in order to solve these problems. According to the present invention, there is provided an optical tactile sensor comprising a tactile section having a transparent elastic body and a plurality of markers provided therein, and imaging means for obtaining a marker image by photographing behavior of markers when an object contacts the sensing surface of the transparent elastic body. The optical tactile sensor is characterized in that the imaging means comprises a plurality of imaging devices, and each of the plurality of imaging devices is provided such that each of the imaging regions which is captured using each of the respective imaging devices has an overlapped imaging region which partially overlaps; the optical tactile sensor further comprising image integration means for integrating each of the marker images which are obtained using the plurality of imaging devices, and the image integration means integrates the imaging regions such that identical markers in the overlapped imaging regions are matched, to thereby form an integrated image.

According to one preferred aspect, the tactile section comprises a large area tactile section which is formed by combining a plurality of small area tactile sections. It should be noted that regarding the relative expressions such as a "large area" and a "small area", in this specification, a "large area" means larger compared to a tactile section such as is to be incorporated into a robotic hand, while a "small area" means smaller compared to a "large area". While a seating surface of a chair, a bed surface, a floor surface, and so forth may be listed as examples of a "large area", objects that are smaller than these items are also included in what is referred to by a "large area".

Further preferably, the tactile sensor comprises a unit comprised of one small area tactile section and one imaging means corresponding to the small area tactile section. The tactile sensor is formed by combining a plurality of the units. Formation of the tactile sensor using sensor units enables creation of a tactile section having a desired area.

The present invention employs another technical means including a method for obtaining a marker image using an optical tactile sensor comprising a tactile section having a transparent elastic body and a plurality of markers provided therein, and an imaging means for obtaining a marker image by photographing behavior of a marker when an object contacts the sensing surface of the transparent elastic body. The method of obtaining marker information comprises a step of providing a plurality of imaging devices as the imaging means and obtaining a partial marker image by photographing a partial region of the transparent elastic body using each of the plurality of imaging devices such that each imaging device has an overlapped imaging region, and a step of forming an integrated marker image by integrating the partial marker images obtained using the imaging means such that identical markers in the overlapped photograph regions are matched.

The present invention employs still another technical means including a method for integrating a marker image, which is employed in an optical tactile sensor comprising a tactile section having a transparent elastic body and a plurality of markers provided therein, and a plurality of imaging devices for obtaining a marker image by photographing behavior of a marker when an object contacts the sensing surface of the transparent elastic body. The image integration method comprises a step of obtaining a partial image by photographing a partial region of the transparent elastic body using each of the plurality of imaging devices such that each imaging device has an overlapped imaging region, and a step of integrating the partial images obtained using the imaging means such that identical markers in the overlapped photograph regions are matched.

As a construction of the tactile portion, preferably, the tactile section comprises a transparent elastic body and a plurality of groups of markers provided inside the elastic body, each marker group being made up of a number of colored markers, with markers making up different marker groups having different colors for each group. The imaging device takes an image of the behavior of colored makers in the transparent elastic body when an object contacts the surface of elastic body.

Also, the present invention includes calibration of each imaging means while using a sensing marker. As the present invention comprises a plurality of imaging devices, calibration of the imaging means is required. As the present invention has a sensing marker as an essential component, the marker can also be used as a calibration marker. Further, the present invention also includes a method for reconstructing a force vector while using such an optical tactile sensor. When a force vector is calculated without the data on the behavior of a marker with less contribution to the force vector calculation, time for force vector calculation can be reduced.

According to the present invention, as the information on the behavior of a marker is obtained using a plurality of imaging means, even a tactile section having a large area can be preferably handled. Therefore, use of a sensor according to the present invention makes it possible to measure force vector distribution over a large area, which in turn makes it possible to determine a force applied to a sensing surface having a large area, based on the obtained marker information. Moreover, as a sensing marker can be used for integration of the image data obtained by the imaging means and calibration of the respective imaging means, the sensor can be formed using a reduced number of components.

DETAILED DESCRIPTION OF THE PREFERRED EMBODIMENT

Figure 1:
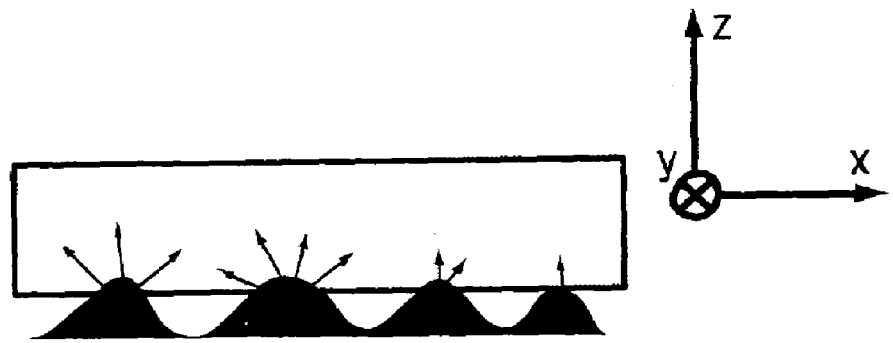
FIG. 1 is a drawing showing force vector distribution exerted between a tactile sensor and an object to be contacted.
Figure 2:
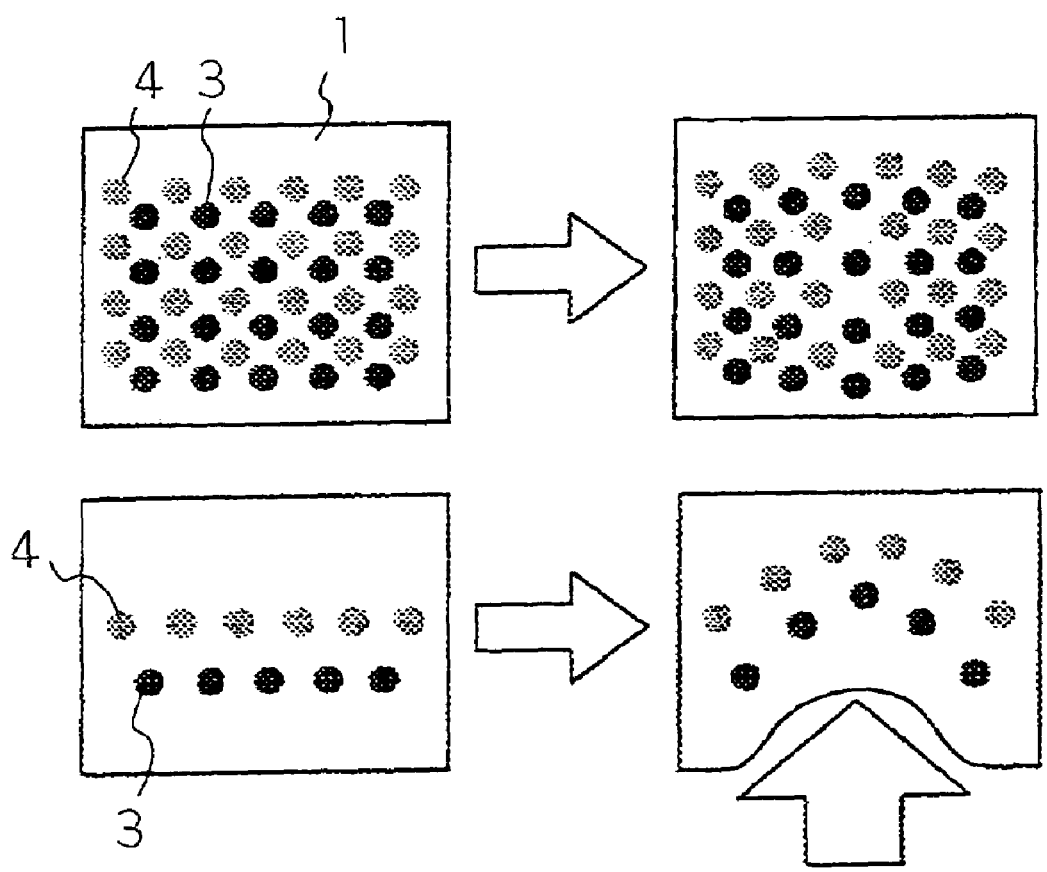
FIG. 2 is a drawing showing the principle of an optical tactile sensor. The upper diagram is a plane view (CCD image) of a transparent elastic body, while the lower diagram is a side view of the transparent elastic body. The transparent elastic body has two kinds of marker groups embedded therein. When force is applied to the transparent elastic body from beneath, the marker moves from what is shown in the left diagram to what is shown in the right diagram.

[A] Basic Construction of Optical Tactile Sensor

An optical tactile sensor of the present invention comprises a sensing section and imaging means. The tactile section comprises a transparent elastic body and a plurality of marker groups provided in said body, each marker group being comprised of a number of colored markers, with markers constituting different marker groups having different colors for each group. The imaging means is provided to take an image of behavior of colored markers when the surface of elastic body is contacted by an object to obtain marker images. A force applied to the surface is reconstructed from information as to the behavior of markers that is obtained from the marker images.

At least one of displacement, strain and inclination of the colored markers when the elastic body contacts an object is observed by photographing behavior of the colored markers. Strain information inside the transparent elastic body is detected from information about the behavior colored markers when a contact object contacts the sensor, and the shape of the contact object calculated from strain information, and information about force acting on a contact interface (including both the elastic body surface and the contact object surface) are also detected. According to the present invention, it is possible to separately collect a plurality of types of information with a simple method called "color coding", and it is possible to acquire a plurality of types of tactile information at the same time with an optical system. According to the present invention, independent observed information (information as to behavior of markers) whose number is equal to or greater than the number of unknowns are collected using color coding, and it is possible to estimate and reconstruct force vectors by stably resolving an inverse problem.

The colored markers are photographed by photographing device, in a preferred example, a CCD camera, and image processing is carried out by a processor. For example, an image at the time of body contact and an image of a previous condition (a condition where external force is not acting on the transparent elastic body) are compared, and an amount of movement of the markers is detected. Alternatively, the markers are embedded in the transparent elastic body in such an arrangement that they can not be recognized normally (in a state where external force is not acting on the transparent elastic body), and a configuration is such that markers are recognized in response to displacement deformation and inclination of markers caused by strain in the vicinity of positions where each of the markers exist when an object contacts the transparent elastic body, and information is detected from the appearance of the colored markers. In another preferable aspect, the behavior of markers (step-like strip markers, for example) can be obtained by variance of marker intensity.

The optical tactile sensor stores a transfer function by which force vectors or force vector distribution applied to the surface of the elastic body are reconstructed from information (movement vectors of each marker when an object contacts the surface, for example) obtained by photographing device as to behavior of markers. The transfer function is a function that associates force information applied to the surface of the sensor with information as to the behavior of markers (movement vectors, for example). The image information of markers is obtained by photographing the colored markers when the object contacts the sensing surface of the elastic body, and the information as to the behavior of markers is obtained from the image information of markers. The force vector is obtained as an output by inputting the obtained information to the transfer function. The number of information as to the behavior of markers that is input to the transfer function is more than the number of force vectors to be obtained.

The transfer function, depending on the shape of the elastic body, may be obtained based on an equation derived from theory of elasticity. However, when the surface of elastic body is an arbitrary curved surface, preferably, the transfer function is obtained by measurement or simulation. The transfer function by measurement or simulation can be obtained from information (movement vectors, for example) as to behavior of markers when x-directional force, y-directional force, and z-directional force having predetermined magnitude, for example, are applied to sampling points arranged on the surface of the sensor.

Figure 3:
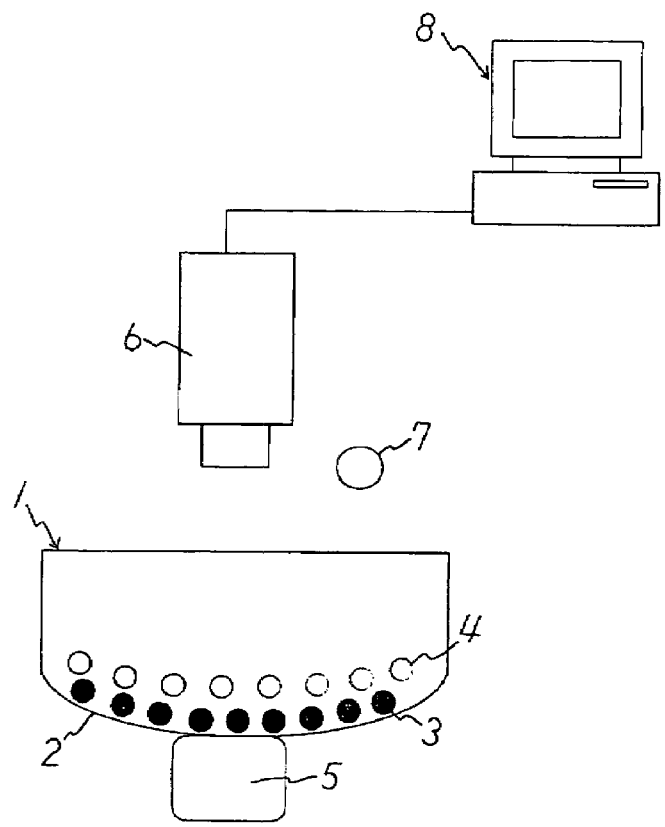
FIG. 3 is a schematic diagram showing an optical tactile sensor according to the present invention.

Referring to FIG. 3, the construction of an optical tactile sensor of the present invention is shown. The sensor comprises a transparent elastic body 1 formed of a transparent elastic material and a curved surface 2, or a surface for sensing. The transparent elastic body 1 is provided with a plurality of colored markers 3, 4 embedded in the transparent elastic body 1 in the vicinity of the surface 2 and along the curved surface 2. A sensing section is comprised of the transparent elastic body 1 and the colored markers 3, 4 arranged inside the elastic body.

The colored markers 3, 4 are comprised of two groups of colored markers and the two marker groups are embedded in different depths respectively from the surface 2. Colored markers 3 constituting one marker group and colored markers 4 constituting the other marker group have different colors to each other. For example, one marker group consists of a plurality of blue markers 3 and the other marker group consists of a plurality of red markers 4.

When an object 5 comes into contact with the transparent elastic body 1, the colored markers 3, 4 provided inside the transparent elastic body 1 are moved due to the internal strain of the elastic body. The sensor is also provided with a camera 6 as a photographing device and a light source 7. The optical camera 6 is arranged at a position on an opposite side to where an object 5 contacts so that the transparent elastic body 1 is provided between the optical camera 6 and the object 5, and behavior or movement of the markers 3, 4 is photographed by the camera 6. The light source 7 may transmit light through a waveguide such as an optical fiber for example. Images of markers 3, 4 obtained by camera 6 as imaging means are transmitted to a computer 8 and the marker images are displayed on a display. The processor of the computer 8 calculates the marker information (movement vectors as movement information, for example) regarding the behavior (displacement, strain or inclination) of markers. The processor reconstructs the distribution of forces applied to the surface 2 by an object 5 using the marker information (movement information, for example) and a transfer function that is stored in the memory device of the computer 8.

The transparent elastic body 1 is preferably made of silicone rubber, but it can also be made from another elastic material such as another type of rubber or elastomer. The markers are preferably made from an elastic material, and more preferably made from the same material as the transparent elastic body 1. In one preferred embodiment, the colored markers are formed by adding pigment to silicone rubber. Since deformation of the elastic body should not be inhibited by the markers, the markers are also preferably made from an elastic material (preferably having the same elastic constant as the elastic body). The material of the markers is not particularly limited as long as the extent to which deformation of the elastic body is inhibited is sufficiently small. It is also possible for a part of the elastic body to constitute the markers.

With the present invention, a plurality of optical markers are distributed within the transparent elastic body 1, and information about a contacting object and information about displacement and deformation within the elastic body produced by contact are detected by photographing situations where displacement, deformation and inclination arise in the markers due to deformation of the elastic body 1 as a result of the object coming into contact with the elastic body 1 using a camera. FIG. 3 shows two marker groups, but the number of marker group is not limited, and three marker groups may be located in a layered manner along the surface 2.

A camera, as a photographing device, is a digital camera, namely a camera for outputting image data as electrical signals, and in one preferred example is a CCD camera. It is also possible to use, for example, a digital camera using a C-MOS type image sensor. If three types of markers are prepared in red, green and blue, there are two methods of perceiving these three colors individually. The first method is to use color filters for separation where each marker can be regarded as being individually photographed directly by looking at RGB output from the camera. The second method is a method where imaging elements perceive only light intensity and light sources of red green and blue are prepared. When red is shone, light is only reflected from the red markers while the red light is absorbed by the markers of the other two colors, and so the camera effectively only perceives the red markers. If this is also carried out at separate times for green and blue, information equivalent to that using the first method can be acquired.

[B] Environment Type Tactile Sensor

An embodiment of an environmental type tactile sensor according to the present invention will be described. An environmental type tactile sensor comprises a plurality of sensor units. As shown in the left diagram in FIG. 4, a sensor unit comprises one small area tactile section 10 and one CCD camera 6 which serves as an imaging means for photographing the small area tactile section 10. As described above in connection with a basic structure, the small area tactile section 10 comprises a transparent elastic body and colored markers provided inside the transparent elastic body. When an object contacts the sensing surface of the transparent elastic body, the colored markers provided inside the transparent elastic body move, and the CCD camera 6 photographs the movements of the colored markers. Then, as shown in the right diagram in FIG. 4, a plurality of sensor units are combined to form a sensor surface having a large area. By carpeting the small area tactile sections 10 so as to form the same plane such that the edges of the tactile sections abut to one another, a large area tactile section 100 is formed. The small area tactile section 10 shown has a square shape in a plane view. Although the shape of the small area tactile section is not limited to square, a square tactile section is advantageous when a plurality of small area tactile sections are carpeted. Also, although a small area tactile section having a plane sensing surface 10 is shown in the drawing, the sensing surface 10 is not limited to plane. A sensing surface having an arbitrary curved surface is also applicable.

Figure 5:
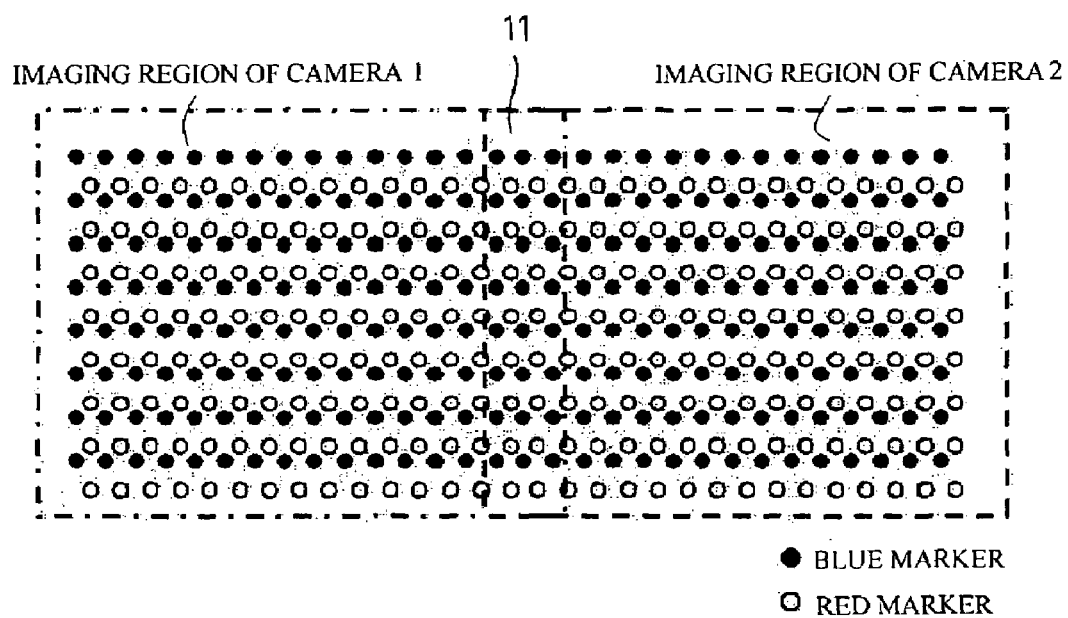
FIG. 5 is a diagram for showing a method for integrating the image data which is obtained using a plurality of imaging means.

As a plurality of CCD cameras 6 are used, integration of the image data obtained using the respective cameras 6 is necessary. FIG. 5 is a diagram explaining integration of the images obtained using a plurality of cameras. Such an image is displayed, for example, on a display of a computer 8. Initially, using a plurality of cameras 6, images of the small area tactile section 10 are taken such that the respective photograph regions partially overlap to one another. Thereafter, the respective images from the cameras are integrated such that the markers in the overlapped photograph regions 11 are matched, thus integrating image data. In FIG. 5, a black circle represents a blue marker, while a white circle represents a red marker, and the photograph regions of the camera 1 and the camera 2 have an overlapped photograph region 11. The blue and red markers within a region corresponding to the overlapped photograph region 11 in the photograph region for the camera 1 and those within a region corresponding to the overlapped photograph region 11 in the photograph region for the camera 2 are matched to one another, whereby the partial images captured using the camera 1 and 2 respectively are integrated. It should be noted that although a spherical marker is referred to here, a marker in other shapes such as is described later can be similarly used for image integration.

Figure 4:
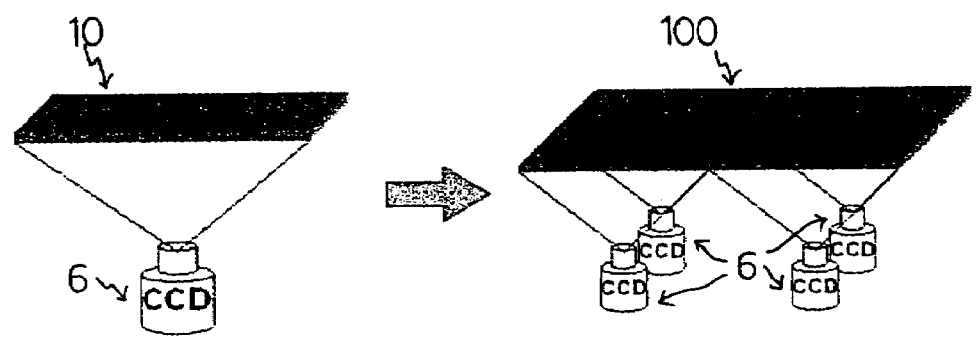
FIG. 4 is a schematic diagram explaining enlargement of the area of a sensor surface. The left diagram shows one unit comprising one CCD camera and an elastic body section, while the right diagram shows the result of area enlargement combining units.
Figure 6:
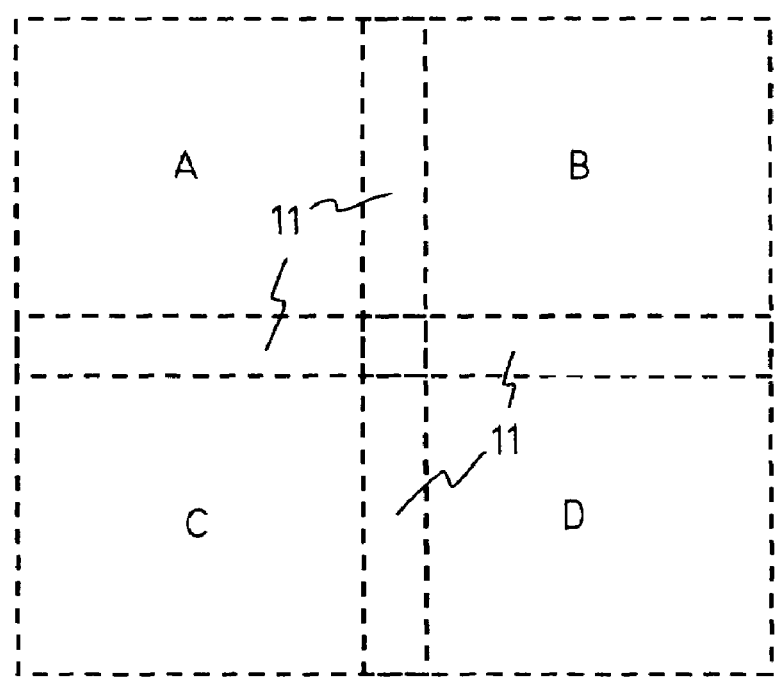
FIG. 6 is a schematic diagram showing image data which is obtained using the sensor shown in FIG. 4.

An image captured using four CCD cameras shown in FIG. 4 is shown in FIG. 6. Supposing that the respective photograph regions photographed by the respective CCD cameras are referred to as A, B, C, and D, the photograph regions A, B, C, and D are integrated such that overlapped photograph regions 11 are resulted in Regions A and B, Regions A and C, Regions B and D, and Regions C and D, respectively. It should be noted that markers are omitted from FIG. 6. Each camera is configured so as to photograph the behavior of the markers located in a region allocated in advance to the camera, and the respective allocated regions have mutually overlapped regions. According to one aspect, each of the respective cameras is set in advance so as to photograph a predetermined partial region of the transparent elastic body, and configured such that integration of the images of the respective predetermined partial regions obtained using the respective cameras enables formation of the entire image of the transparent elastic body.

Calibration of a camera to be applied when a plurality of imaging means (CCD cameras) are used is described. Generally, camera calibration is applied for correction of distortion caused in the captured image due to the lens and also for determination of the position and orientation of the camera in the world coordinate system. Occurrence of distortion due to a lens is inevitable when a wide lens is used. The position and orientation of the camera is most accurately determined when using image data. In this tactile sensor, as correlation between the image data and the actual position needs to be determined, it is necessary to apply camera calibration. Generally, in a measurement system using a plurality of cameras, the following procedure needs to be followed. Initially, a stripe or black-white tile pattern with known pattern intervals is placed in a position which is known relative to the world coordination system, and the pattern is photographed. Then, displacement from an image which would be captured when the lens had no distortion is calculated using the captured image, and the lens distortion and the position and orientation of the camera are determined. Here, in an environmental type tactile sensor which similarly employs a plurality of cameras, the stripe or black-white tile pattern with known pattern intervals is already arranged in a known position as a colored marker for sensing and ready to be acquired as an image. Therefore, camera calibration, which originally needs to be conducted before assembly of the measurement system can be conducted anytime after the assemblage.

[C] Method of Reconstructing Force Vector Distribution on Sensing Surface

Figure 7:
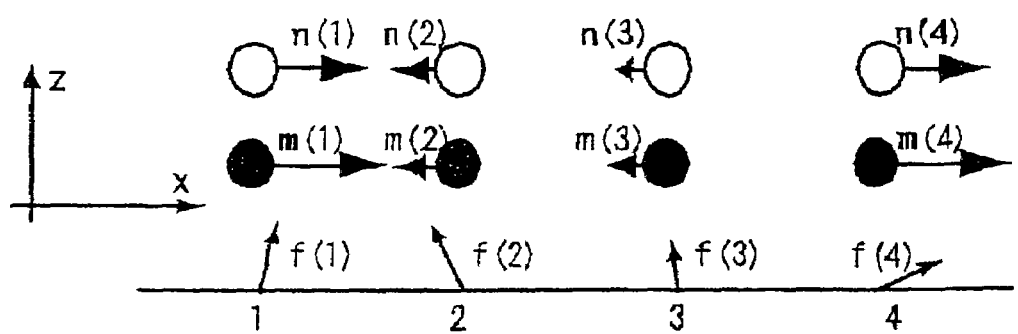
FIG. 7 is a diagram explaining a force vector applied to a contact surface (plane surface) and movement of the marker.
Figure 8:
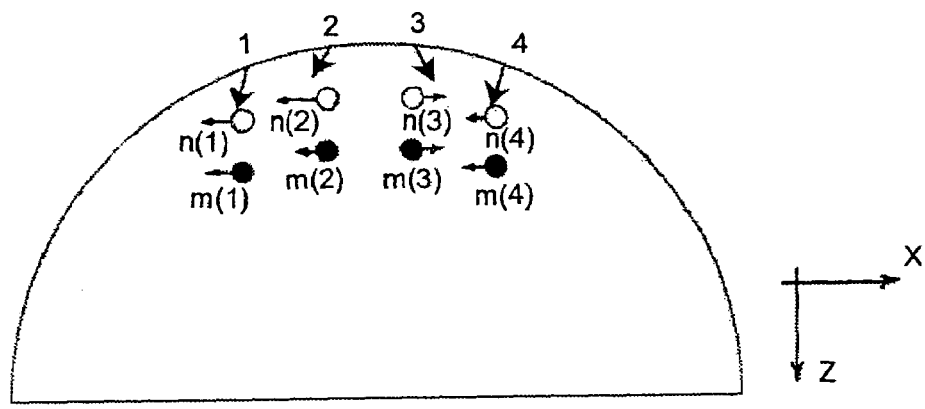
FIG. 8 is a diagram explaining a force vector applied to a contact surface (free curving surface) and movement of the marker.
Figure 9:
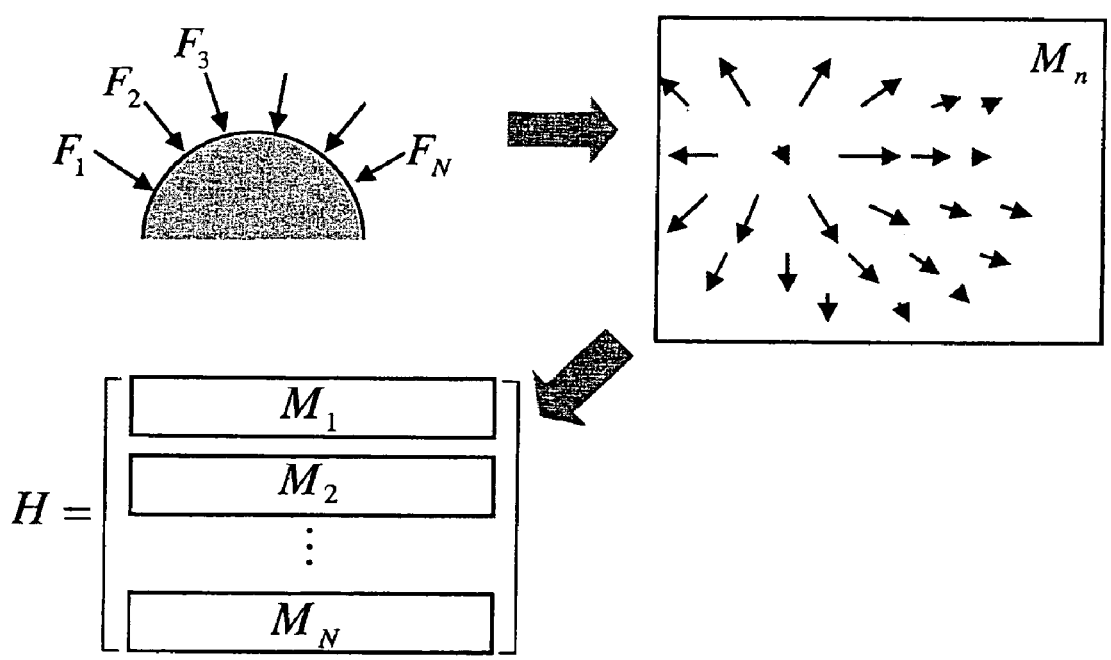
FIG. 9 is a diagram explaining a method for creating a transfer function for use in reconstruction of force vector distribution.

To obtain force vector distribution applied to a surface of the sensor from obtained information (movement vectors of markers, for example) as to behavior of markers by an optical tactile sensor, a transformation from information (movement information, for example) M as to the behavior of markers to force information F is required. The transformation from the marker information M to the force information F is obtained by an equation F=HM. Referring to FIG. 7 and FIG. 8, a method of reconstructing the force vector distribution from the marker information will now be described based on a method of obtaining the force vector distribution from the movement vectors of markers. FIG. 7 and FIG. 8 are substantially the same except that FIG. 7 shows a plane sensing surface while FIG. 8 shows an arbitrary curved sensing surface. Here, though, for the purpose of simplification, only two-dimensional section (y-axial direction is omitted) is considered, an algorithm is the same for a general three-dimensional space.

Reference f refers to a force vector applied to a contact surface, and references m and n refer to a movement vector of a blue marker and movement vector of a red marker in the CCD element. Discrete finite points (four points in FIG. 7 and FIG. 8) are considered. As foregoing, force vector distribution has three components (x component, y component and z component), but only two components (x component and z component) are considered. Generally, taking an image by a camera means a projection of a three-dimensional object to a pixel plane of a two-dimensional plane so that marker movements only in the horizontal direction (x component and y component) are projected in the plane. Here, marker movement only in x direction component is observed.

Here, eight components, f=[fx(1), fx(2), fx(3), fx(4), fz(1), fz(2), fz(3), fz(4)] are force vector distribution to be obtained, where m=[m(1), m(2), m(3), m(4)] and n=[n(1), n(2), n(3), n(4)] are movement vectors to be measured. The vectors m and n are represented as X. Namely, X=[m(1), m(2), m(3), m(4), n(1), n(2), n(3), n(4)]. Here, movement vectors m and n that are observed when a unit force (magnitude of 1) in the x-direction is applied to a point 1 are represented as Mx(1).

Namely, Mx(1)=[m(1), m(2), m(3), m(4), n(1), n(2), n(3), n(4)] when f=[1, 0, 0, 0, 0, 0, 0, 0].

Similarly, a movement vector of each marker when a unit force in the z-direction is applied to a point 1 are represented as Mz(1), a movement vector of each marker when a unit force in the x-direction is applied to a point 2 are represented as Mx(2), and so on. In case of a linear elastic body where linear summation relationship holds between applied forces and strains (most elastic bodies meet this characteristics), movement vectors are represented as $$X = Mx(1) \times fx(1) + Mz(1) \times fz(1) + Mx(2) \times fx(2) + \ldots + Mz(4) \times fz(4),$$

when general forces f=[fx(1),fx(2),fx(3),fx(4),fz(1),fz(2), fz(3),fz(4)] are given. Conversely, the fact that the movement vectors can be represented as foregoing means that superposition of forces holds, therefore, the elastic body is a linear elastic body.

When the equation is represented as a matrix form, X=H×f, where H=[Mx(1); Mx(2); . . . ; Mz(4)]. The H is called a transfer function because the H is a map that transfers a force f to deformation x. The matrix form written with an element is the following.

$$\begin{bmatrix} m(1) \\ m(2) \\ m(3) \\ m(4) \\ n(1) \\ n(2) \\ n(3) \\ n(4) \end{bmatrix} = \begin{bmatrix} Hmx(1,1) & Hmz(1,1) & Hmx(1,2) & Hmz(1,2) & Hmx(1,3) & Hmz(1,3) & Hmx(1,4) & Hmz(1,4) \\ Hmx(2,1) & Hmz(2,1) & Hmx(2,2) & Hmz(2,2) & Hmx(2,3) & Hmz(2,3) & Hmx(2,4) & Hmz(2,4) \\ Hmx(3,1) & Hmz(3,1) & Hmx(3,2) & Hmz(3,2) & Hmx(3,3) & Hmz(3,3) & Hmx(3,4) & Hmz(3,4) \\ Hmx(4,1) & Hmz(4,1) & Hmx(4,2) & Hmz(4,2) & Hmx(4,3) & Hmz(4,3) & Hmx(4,4) & Hmz(4,4) \\ Hnx(1,1) & Hnz(1,1) & Hnx(1,2) & Hnz(1,2) & Hnx(1,3) & Hnz(1,3) & Hnx(1,4) & Hnz(1,4) \\ Hnx(2,1) & Hnz(2,1) & Hnx(2,2) & Hnz(2,2) & Hnx(2,3) & Hnz(2,3) & Hnx(2,4) & Hnz(2,4) \\ Hnx(3,1) & Hnz(3,1) & Hnx(3,2) & Hnz(3,2) & Hnx(3,3) & Hnz(3,3) & Hnx(3,4) & Hnz(3,4) \\ Hnx(4,1) & Hnz(4,1) & Hnx(4,2) & Hnz(4,2) & Hnx(4,3) & Hnz(4,3) & Hnx(4,4) & Hnz(4,4) \end{bmatrix} \begin{bmatrix} fx(1) \\ fz(1) \\ fx(2) \\ fz(2) \\ fx(3) \\ fz(3) \\ fx(4) \\ fz(4) \end{bmatrix}$$

where Hmx(x1, x2) represents a displacement amount in x-direction of m marker in a certain depth at a coordinate x=x1 with a unit force in the x-direction applied to a surface at a coordinate x=x2. Similarly; Hnz(x1, x2) represents a displacement amount in z-direction of n marker in a certain depth at a coordinate x=x1 with a unit force in the z-direction applied to a surface at a coordinate x=x2.

This is a simple multiplication of matrices where reference x is 1×8 matrix reference H is 8×8 square matrix, and reference f comprises 1×8 components. Thus, f can be obtained from observed x by multiplying an inverse matrix of H. Namely, f=inv(H)×X (Equation 1) where inv represents inverse matrix (generalized matrix inverse).

The matrix form written with an element is the following.

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \\ Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

where Imx(1,1) and the like represent each element of inv(H) and represent contribution of m(1) for calculating fx(1).

The important thing is that the number of observed data must be equal to or more than the number of unknowns when determining unknowns by using an inverse matrix defined by a transfer function. To solve this problem, the present invention employs two layers of differentially colored marker groups so as to increase the number of independent observed data up to eight by observing a movement of each marker in the two layered marker groups.

In case of three-dimensional space (where y-axis is added to the drawing), at a point, a force vector has three degrees of freedom, and a horizontal movement vector of markers has two degrees of freedom. If the number of sampling points is four, the number of unknowns f is twelve, where f=[fx(1), fy(1), fz(1), fx(2), fy(2), fz(2), fx(3), fy(3), fz(3), fx(4), fy(4), fz(4)], whereas the number of observed movement vectors is eight and is insufficient, where m=[mx(1), my(1), mx(2), my(2), mx(3), my(3), mx(4), my(4)].

By providing two layered markers, it is possible to obtain sixteen observed data by observing the layered markers and to determine twelve unknowns. Due to redundancy in the number of obtained information, robust extrapolation can be performed. Using the foregoing algorithms, the force vectors are extrapolated from the CCD image. Even with other measurement methods of the present invention using other types of marker configurations, for example, the measurement methods are substantially the same.

[D] Transfer Function Used for Reconstructing Force Vector Distribution

Next, a method of obtaining the transfer function will be described. In an elastic body having a characteristic shape (a semi-infinite elastic body, for example), as a function defining a force applied to a surface and an internal strain, a function where the foregoing equation held in the microscopic region can hold in any regions of the internal portion of the elastic body has been found as a numerical equation. In this case, a matrix H can be obtained by substituting coordinates of finely divided elastic body surfaces and coordinates of internal markers into the function.

Here, the numerical equation is a function G by which the internal strain can be obtained from the surface stress in the form of m(x2, y2)=G(f(x1), x2, y2), where f(x1) represents surface stress and m(x2, y2) represent internal strain. For example, when a force is applied to a point 1 in FIG. 7 and FIG. 8, displacement of marker 2 can be obtained by m(2, y2)=G(f(1), 2, y2), where y2 is a known marker depth.

Depending on the shape of elastic body, a matrix H is obtained using the foregoing equation assuming that an elastic body is a semi-infinite elastic body. It is found that surface stress cannot be correctly obtained when the equation for semi-infinite elastic body is applied for an arbitrary curved surface such as a hemispherical surface. It is therefore necessary to associate a surface stress with an internal strain by any other means.

A first method is to associate a surface stress with an internal strain by numerical simulation. By dividing the surface of the sensor into meshes, it is possible to calculate the movement amount of markers when a unit force is applied to each mesh in x-direction, y-direction and z-direction by simulation.

A second method is to actually apply a force to the surface. Forces F1, F2, F3, F4 ..., Fn having known magnitude are applied to an arbitrary curved surface of elastic body. Movement vectors (Movements of markers caused by each known force) M1, M2, M3, M4, ..., Mn of markers as to each force applied are measured and stored. F1 represents three vectors F1x, F1y, F1z and movement vectors of respective markers are given as M1x, M1y, M1z when these forces are applied. A matrix H is obtained from the forces having known magnitude and obtained information (movement vector). The second method will be explained in detail.

Firstly, numerous sampling points are discretely arranged on the surface of elastic body. In one preferable aspect, the sampling points are arranged so as to cover an overall area of the surface. In one aspect, numerous discrete sampling points are arranged (concentrically arranged in plan view) according to curvilinear coordinates. In another aspect, the sampling points are arranged to provide a grid arrangement in a plan view.

At each sampling point, information that associates forces having known magnitude applied in x-direction, y-direction, and z-direction with corresponding movement vectors of markers when the forces are applied is obtained. In one preferable method, forces having the predetermined magnitude are independently applied to each sampling point in x-direction, y-direction and z-direction, and each movement vector of markers is measured and stored. Orientations of x-direction, y-direction and x-direction of force vectors applied on the sampling points are not limited as long as an arbitrary force applied to the surface can be represented by using these force vectors.

Forces applied to each sampling point have known magnitude, and in one preferable aspect, a force with constant magnitude, 100 [gf] for example, is applied to the sampling point in x-direction, y-direction, and z-direction, respectively and movement vectors of each instance are measured. It is not necessary that forces applied to each sampling point have the same magnitude as long as the magnitude of each force is known. Movement vector of markers may be measured based on forces having different magnitudes, and later on, the magnitude of movement vector can be normalized.

As foregoing, the matrix H can be obtained by simulation or measurement where the matrix H is the transfer function that associates force information F with information M as to the behavior of marker (movement information, for example). The optical tactile sensor comprises a memory device and a processor. The matrix H obtained is stored in the memory device. A marker image is obtained by a photographing device when an object contacts the transparent elastic body and an arbitrary force is applied to a surface of a sensor. A movement vector of marker is measured from the obtained marker image by the processor. The measured movement vector of marker is input to the matrix H and calculated by the processor, thereby outputting force vector that is applied to the surface of the elastic body.

[E] Computation Time Reduction Method

Here, if the number of elements of a matrix H becomes large, the time for calculating force distribution from movement information becomes long. This is due to use of movement information for all markers when obtaining force applied to a particular point. In actual fact, in the case of adopting the previously described algorithm, the H matrix becomes gigantic, and time is taken in matrix operation for equation 1. Giving one example, in the case of a mesh of 100×100, there are 10,000 observation points which means that H matrix becomes a gigantic matrix of 10,000×10,000. Generally, in the case of a sensor surface partitioned into N×N, since the number of observation points are N squared, the size of the H matrix becomes N squared by N squared. Thus, time of four times N is taken for matrix operation of equation 1. It means that this problem is brought to the fore for the environment type sensor of the present invention that often comprises a large area surface. Accordingly, it becomes necessary to have a method for shortening the computation time.

The proposed method extracts a part of the H matrix and utilizes the same. As described above, a correspondence relationship for force applied to all lattice points and movement of all markers is described in the H matrix. However, as an actual problem, for example, it is possible to ignore the effect marker provided that a distance between the force application points and the marker is sufficient. If this is done, for example, in FIG. 7 and FIG. 8, by assuming that it is acceptable to use only first to second markers in calculating f(1), and to use only first to third markers in calculating f(2), it is possible to make the size of the matrix small. A new matrix in this example is as follows.

Original equation 1 f=inv(H) x is as follows:

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \\ Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

This equation becomes an equation as follows by ignoring contribution at places separated by distance.

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} Imx(1,1) & Imx(2,1) & 0 & 0 & Inx(1,1) & Inx(2,1) & 0 & 0 \\ Imz(1,2) & Imz(2,2) & Imz(3,2) & 0 & Inz(1,2) & Inz(2,2) & Inz(3,2) & 0 \\ 0 & Imx(2,3) & Imx(3,3) & Imx(4,3) & 0 & Inx(2,3) & Inx(3,3) & Inx(4,3) \\ 0 & 0 & Imz(3,4) & Imz(4,4) & 0 & 0 & Inz(3,4) & Inz(4,4) \\ Imx(1,1) & Imx(2,1) & 0 & 0 & Inx(1,1) & Inx(2,1) & 0 & 0 \\ Imz(1,2) & Imz(2,2) & Imz(3,2) & 0 & Inz(1,2) & Inz(2,2) & Inz(3,2) & 0 \\ 0 & Imx(2,3) & Imx(3,3) & Imx(4,3) & 0 & Inx(2,3) & Inx(3,3) & Inx(4,3) \\ 0 & 0 & Imz(3,4) & Imz(4,4) & 0 & 0 & Inz(3,4) & Inz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

Places with zero are points separated by distance that should be ignored. Calculation at higher speed can be effectuated because there is no need to compute them. This speed increase provides an accelerated effect as the lattice size N becomes larger, as described previously.

Figure 10:
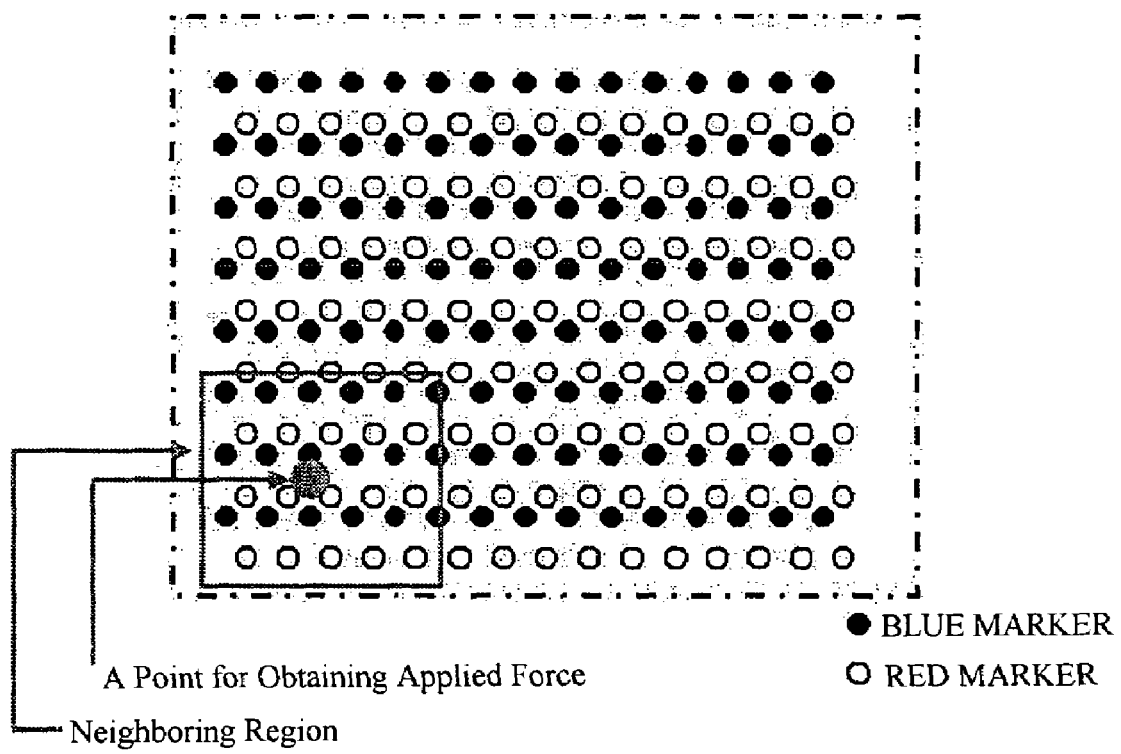
FIG. 10 is a diagram showing an integrated image captured using a plurality of cameras and explaining a method for reducing the time for calculation necessary for reconstruction of a force vector, in which, when a force applied to a point is obtained, data on only the markers located in its vicinity are used in the calculate of the force.

This is equivalent to using an extracted surface area containing a place where it is desired to obtain force vectors (FIG. 10). With the situation in the drawing, in a two dimensional image of the entire contact surface, a region in the vicinity of a place where it is desired to obtain force vector distribution is set. Here, in the event that a region in the vicinity of a place where it is desired to obtain force vectors is set, the neighboring region is not necessarily determined based on only a distance in the two dimensional image. Namely, a distance between force application points and a marker is a spatial distance, and in cases such as where marker groups are layered inside an elastic body, there may be cases where it is desirable to consider depth with the marker is provided.

In the case of a contact surface that is an arbitrary curved surface, contribution of places separated by a distance is not always small. Therefore another method of shortening computation time is proposed. First of all, a transfer function (an inverse matrix) is obtained by actual measurement or simulation. A method for producing this type of transfer function has already been described. For example, when looking at elements of a matrix for a transfer function based on actual measurement, if a particular element of the matrix approaches zero, a marker corresponding to the element can be considered to be a marker that can be ignored for the purpose of obtaining a particular force vector. It is possible to compute the force vector with sections where the particular element of the matrix of the transfer function approaches zero automatically omitted from the computation. For example, a threshold representing an index of the extent to which it is possible to ignore in force vector reconstruction is set for the matrix elements, and the value of matrix elements having a value smaller than the threshold value are made zero.

Further, improvement for the computation shortening method will be described. With respect to the point of extracting a particular region of the image, it is the same as for the foregoing computation shortening method. The foregoing method deals with only information inside the extracted region while the improved method provides sampling points outside the extracted region for force to be computed. With respect to movement of the marker, only information inside the extracted region is handled. The sampling points are points for taking into consideration the effect of force from the outside region. That is, movement of a marker inside the extracted region can be affected to a certain extent by force applied outside the extracted region. At the time of reconstructing force vectors based on movement information of markers inside the extracted region, by computing not only force acting inside the extracted region force but also force acting outside the extracted region, force acting inside the extracted region is reconstructed while taken into consideration force acting outside the extracted region.

Also, force sampling points outside the region are set sparsely with distance from the extracted region. This is because it is considered that representation is possible with fewer sampling points because the effect with becomes slighter with increased distance of separation from the region. If description is given based on FIG. 11, a small region corresponding to sampling points of 5×5 points is set in an image of a tactile sense section. Sampling points are set densely inside the small region. Sampling points for force are also arranged outside the small region. Sampling points for force outside the small region are arranged more sparsely with distance from the small region. With the example in the drawing, at sites close to the small region, sampling points are arranged densely, at the same density as inside the small region, and as separation from the small region increases, the sampling points are arranged more sparsely.

Figure 11:
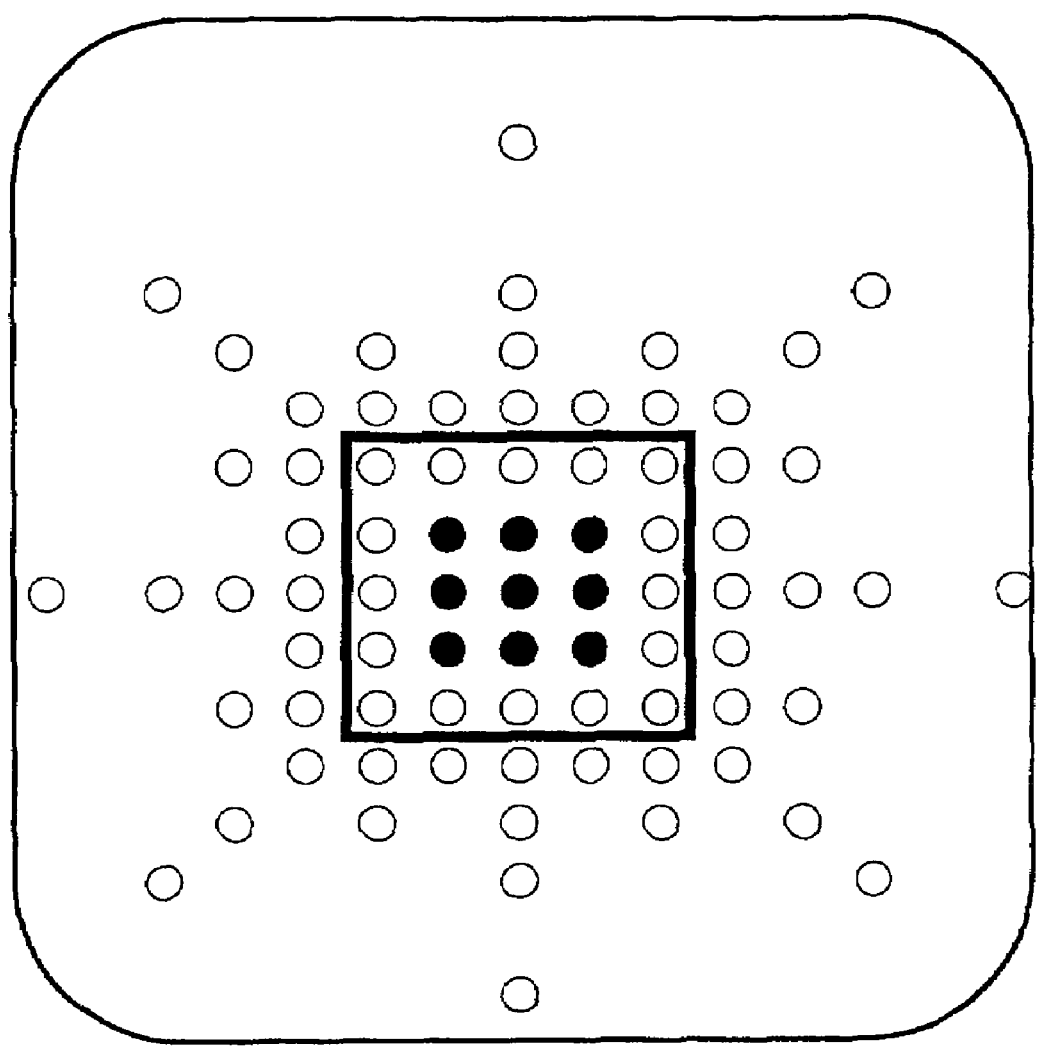
FIG. 11 is a conceptual diagram explaining an improved manner of the calculation reduction method. In the drawing, black and whit circles represent sampling points for force, and the black circle shows a result of calculation to be used after the calculation.
Figure 12:
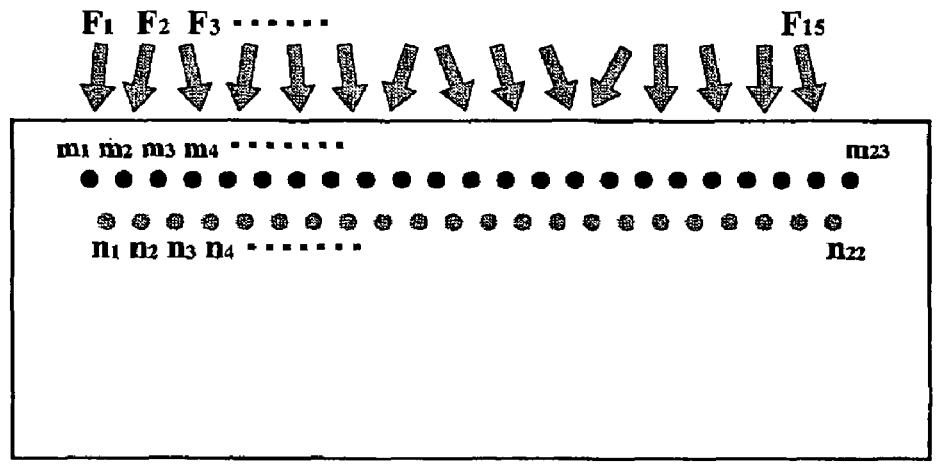
FIG. 12 is a diagram showing an increased number of markers.
Figure 12:
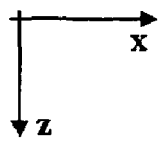
Figure 13:
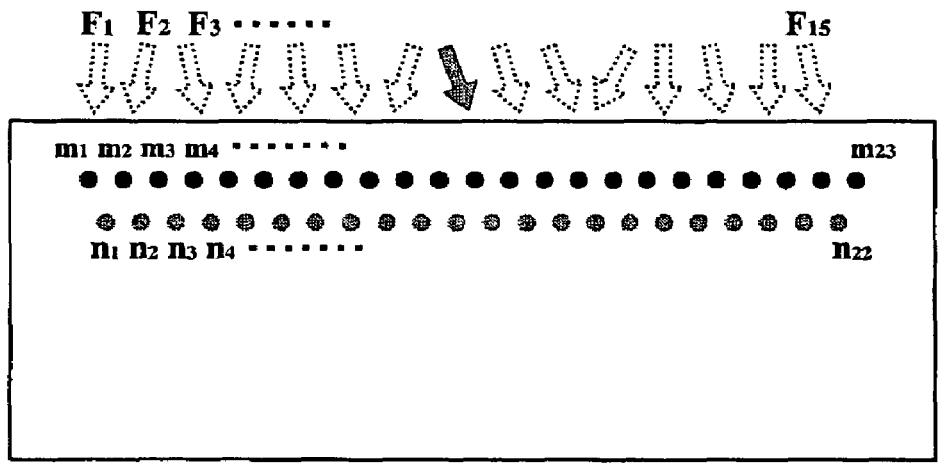
FIG. 13 is a diagram showing an increased number of markers, in which movement of a marker caused relative to the force applied to one point is focused.
Figure 13:
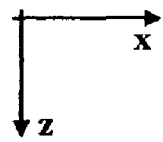

Then, force vectors for sampling points arranged inside and outside the small region are calculated using movement information of markers inside the small region. Of the calculated force vectors, only the results for at least some of the force vectors inside the small region are adopted and saved as final computation results. With the example in FIG. 11, force vectors for sampling points for force arranged 3×3 inside the small region of 5×5 are saved as final calculation results. Sampling points outside the small region and sampling points not adopted inside the small region are discarded. The extracted small region is then sequentially shifted as obtaining force vectors for the region, so that force vector distribution for the entire measurement region of the sensor is obtained. In FIG. 11, force vectors for a part of sampling points of the small region are utilized, but it is also possible to utilize force vectors for all sampling points inside the small region. Also, in FIG. 11, force vectors for a plurality of sampling points for a part of the small region are utilized, but it is also possible to utilize only force vectors for one sampling point inside the small region. In FIG. 11, a small region of 5×5 points is shown, but the size of the extracted region is not limited. Using this improved method, compared to the above described computation shortening method, the amount of computation may be increased but there is sufficient shortening of the computation time compared to before adopting a speed increasing method.

Description will be given for an improved method, based on FIG. 12 to FIG. 15. With FIG. 12, for ease of description of the improved method the number of marker points is increased compared to that shown in FIG. 7 and FIG. 8. Due to the increased number of marker points, there is a corresponding increase in the number of elements in the equations, and for that reason, in FIG. 13, only x, z directional movements for a marker n corresponding to force for one particular point is shown. This is equivalent to a situation where only sections corresponding to elements Imx(1,1), Imx(2,1), Imx(3,1), Imx(4,1), Imx(1,2), Imx(2,2), Imx(3,2) and Imx(4,2) of matrix inv(H) in equation 3 are extracted and the number of marker points is increased.

Figure 14:
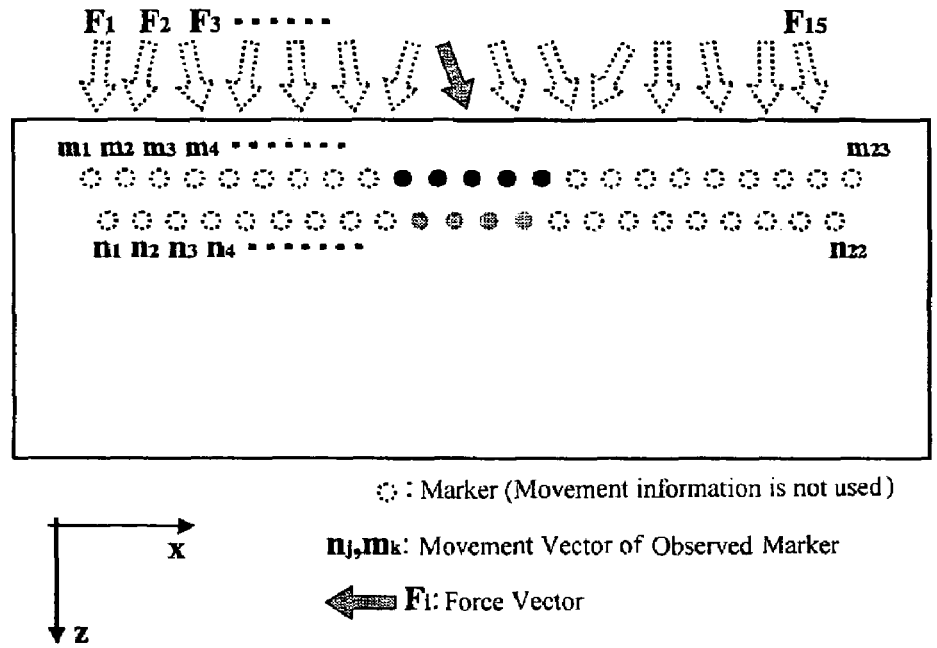
FIG. 14 is a diagram explaining the speed increasing method shown in FIG. 10, based on FIG. 13.
Figure 15:
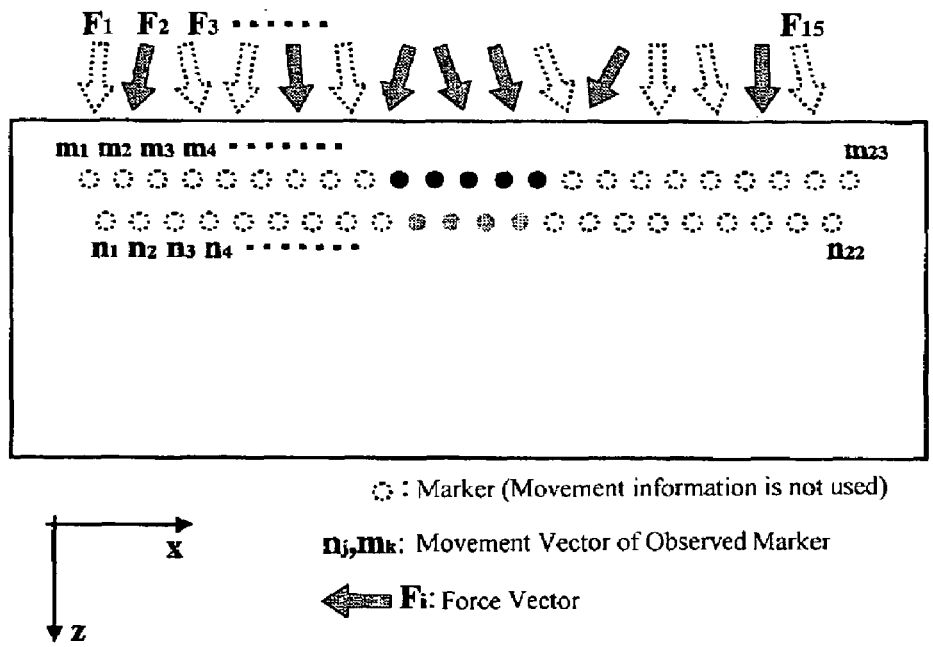
FIG. 15 is a drawing explaining an improved method, based on FIG. 13.

The speed increasing method before improvement uses only movement information of markers that exists close to points to which force being obtained is applied, and as shown in FIG. 14, only movement information for markers $m_{10}$ to $m_{14}$ is used. In this respect, if the speed increasing method after improvement is illustrated, it is as shown in FIG. 15. That is, not only $F_8$, but also $F_2$, $F_5$, $F_9$, $F_{11}$ and $F_{14}$ are arranged as force sampling points. In the computed force vectors, only force vectors for $F_{x8}$ and $F_{z8}$ are utilized.

[F] Other Embodiments of Marker Group

As for a tactile portion of optical tactile sensor, in preferred embodiments, a plurality of groups of markers are embedded in the transparent elastic body, each group of markers being made up of a large number of markers, markers constituting different marker groups having different colors for each group, and the marker groups having a different spatial arrangement. As an example of this differing spatial arrangement, a plurality of marker groups are arranged in a layered manner inside the elastic body. As an example of layered markers, the markers constituting the marker groups are microscopic spherical particles and the spherical markers constituting the marker group for each layer have different colors from each other. As another example of this differing spatial arrangement, a plurality of marker groups are arranged so as to intersect each other. As still another example of this differing spatial arrangement, each marker group is a plane group comprised of a plurality of planes extending in the same direction, and extending directions and colors thereof are different between each marker group. The shape of the colored markers is not particularly limited, and preferable examples can be spherical, cylindrical, columnar, strip shaped or flat.

Though the present invention is described based on the spherical markers as one of preferable aspects, the shape and/or arrangement of markers are not limited to the foregoing. Referring to FIGS. 16 to 19, other shapes and arrangements of markers will now be described. Detail descriptions of these markers are described in WO02/18893 A1 and incorporated herein by reference. Further, the shape and/or arrangement of markers are not limited to the drawings of the present application and WO02/18893 A1.

Figure 16:
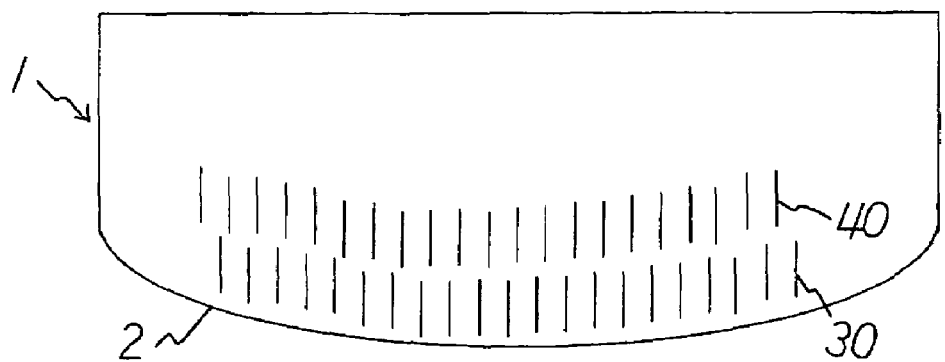
FIG. 16 is a diagram showing another embodiment of a marker (cylindrical marker).

Referring to FIG. 16, colored markers being comprised of extremely thin cylinders or columns having microscopic cross sections are shown. Two marker groups are arranged at different depths from the surface 2. A marker group made up of extremely thin blue cylindrical markers 40 and another marker group made up of extremely thin red cylindrical markers 30 are embedded along the surface 2 and are layered at different depths from the surface. The markers extend along imaginary lines connecting an object coming into contact with the elastic body and a camera. Arrangement of each marker is not limited to the drawing, and it is possible to provide three or more groups of marker each having different colors.

Figure 17:
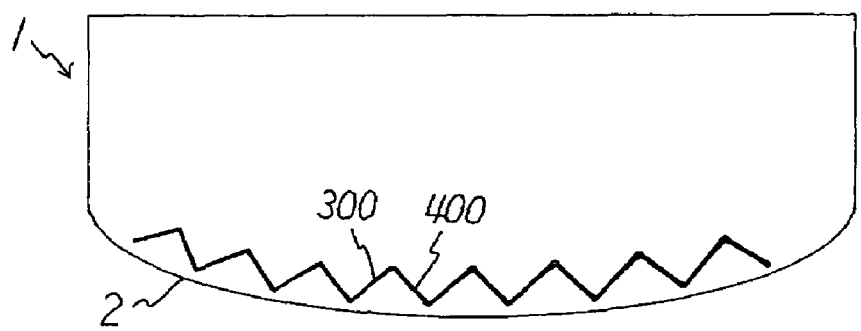
FIG. 17 is a diagram showing another embodiment of a marker. The upper diagram shows a stepwise band marker, while the lower diagram shows a pyramidal marker.
Figure 17:
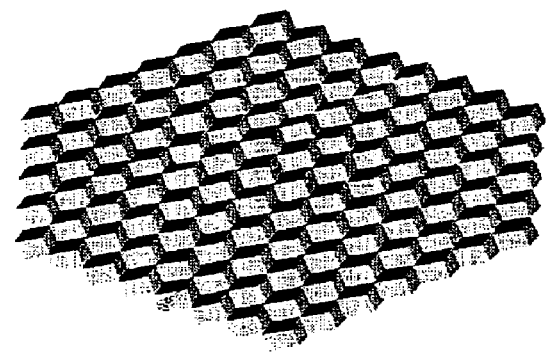

Referring to an upper view of FIG. 17, inclined plane markers 300, 400 are arranged in the elastic body 1 in a step-like fashion. In one preferable aspect, parts (a step-shaped interface) of the elastic body 1 constitute markers 300, 400. In another aspect, separate plane markers may be embedded in the elastic body 1. The interface can be divided into two surface groups, all surfaces in a group having the same direction. The surfaces in each group are made the same color (here one interface 300 is blue, and the other interface 400 is red). It is possible to acquire observation values containing vertical and horizontal components of force vectors at a particular point as information by observation of intensity of the two colors at that point. By sensing the observed intensity, it is possible to reconstruct surface distribution of force vectors.

The surface markers having two colors are illustrated in the upper view of FIG. 17, but surface markers having three colors may be used. As shown in the lower view of FIG. 17, using so called pyramid manufacturing where microscopic cubes are gathered at a bottom surface, if three groups of surfaces facing in the same direction are respectively made the same color (for example, red, green and blue), it is possible to respectively obtain degrees of freedom for force acting in a horizontal direction on a contact surface as intensity ratios for three colors, and force acting in a vertical direction using a total intensity of the three colors.

Figure 18:
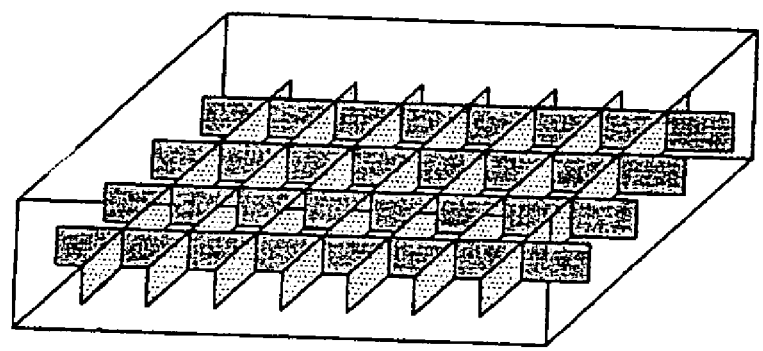
FIG. 18 is a diagram showing another embodiment of a marker (crossing strip marker).

Referring to FIG. 18, two marker groups (a marker group comprising a plurality of thin red strips arranged in a row and a marker group comprising a plurality of thin blue strips arranged in a row) are aligned so that respective markers are orthogonal to each other, but the spatial arrangement relationship between the plurality of marker groups is not limited. It is also possible for the two sides of the strips constituting the marker to have different colors. In the drawing, side portions of the strip markers extend along an observation direction but the side portions of the strip markers may be inclined to an observation direction.

Figure 19:
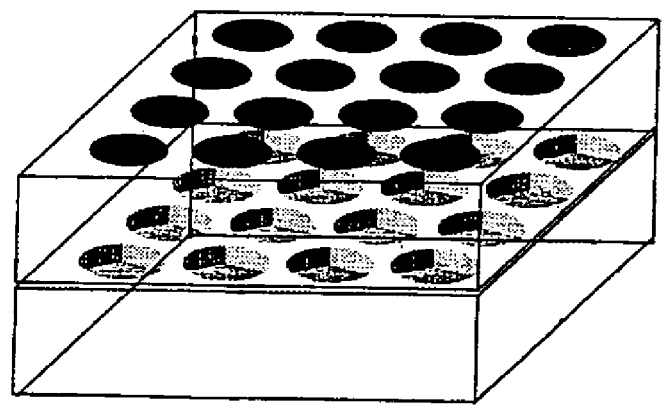
FIG. 19 is a diagram showing another embodiment of a marker (color-discriminated plane marker).

FIG. 19 shows a sensing part having a plurality of plane markers. The plane markers are normally concealed by concealment markers and each plane marker is partitioned into a plurality of portions having different colors for each portion, and the partitioned portions having the same color constitute each marker group. The plane markers and said concealment markers are provided and spaced with each other in the elastic body, and an arrangement is made such that said the markers are concealed by the concealment markers and not observed in a state where external force is not acting on the transparent elastic body. When shear strain arises, the positions of the concealment markers 6 and the colored markers 20 become offset, giving color. With the sensor in the drawing, the markers are coated with three colors RGB, and it is possible to ascertain the strain direction from the color produced.

INDUSTRIAL APPLICABILITY

The present invention can be widely applied to a tactile sensor. As a preferable example, use of the sensor on a seating surface of a chair enables measurement of the distribution of pressure applied to the hip portion of a person sitting on the chair. Also, use of the sensor on a bed enables measurement of the distribution of pressure caused by a person lying on the bed, and use of a sensor installed on a floor surface enables measurement of walking and gravitational agitation.

The invention claimed is:

1. An optical tactile sensor comprising:
   a tactile section having a transparent elastic body and a plurality of markers provided therein;
   imaging means for obtaining a marker image by photographing behavior of markers when an object contacts the sensing surface of the transparent elastic body,
   wherein said imaging means comprises a plurality of imaging devices, and each of the plurality of imaging devices is provided such that each of the imaging regions which is captured using each of the respective imaging devices has an overlapped imaging region which partially overlaps; and
   said optical tactile sensor further comprising image integration means for integrating each of the marker images which are obtained using the plurality of imaging devices,
   wherein the image integration means integrates the imaging regions such that identical markers in the overlapped imaging regions are matched, to thereby form an integrated image.

2. The sensor of claim 1, said sensor comprising a display for displaying an image obtained by each imaging device.

3. The sensor of claim 1 wherein said tactile section comprises a large area tactile section which is formed by combining a plurality of small area tactile sections.

4. The sensor of claim 3 wherein the tactile sensor comprises a unit comprised of one small area tactile section and one imaging means corresponding to the small area tactile section and the tactile sensor is formed by combining a plurality of the units.

5. The sensor of claim 1 wherein said tactile section is comprised of a transparent elastic body and a plurality of groups of markers provided therein, each marker group being made up of a number of colored markers, with markers making up different marker groups having different colors for each group, and the imaging device taking an image of the behavior of colored makers in the transparent elastic body when an object contacts the surface of elastic body.

6. A method of reconstructing force vector using the sensor of claim 5, said method comprising the steps of:
   obtaining a marker image by taking an image of behavior of colored markers when an object contacts a contact surface of the elastic body;
   obtaining information relating to the marker behavior from the marker image, said information being more than the number of force vectors to be obtained; and
   obtaining force vectors as outputs by inputting said obtained information relating to the marker behavior to a transfer function,
   wherein said obtaining force vectors calculates force vectors omitting information relating to behavior of the marker that has low extent of contribution to force vector calculation.

7. The method of claim 6, said obtaining force vectors comprising calculating force vectors using only information relating to behavior of markers in the vicinity of a position where it is desired to obtain force vectors.

8. The method of claim 7, wherein said position comprises one or more sampling points.

9. The method of claim 8, said method further comprising the steps of:
   arranging a plurality of sampling points around said position;
   obtaining force vectors acting at the sampling points at and around said position using information relating to marker behavior in the vicinity of said position; and
   adopting only force vectors acting at said position in the calculated force vectors.

10. The method of claim 9, wherein the sampling points are arranged more sparsely as separation from said position.

11. The method of claim 6, wherein said obtaining force vectors comprising calculating force vectors omitting elements that are close zero in elements of the matrix.

12. A method of reconstructing force vector using the sensor of claim 5, said method comprising the steps of:
   obtaining a marker image by taking an image of behavior of colored markers when an object contacts a contact surface of the elastic body;
   obtaining information relating to the marker behavior from the marker image, said information being more than the number of force vectors to be obtained;
   setting a small region of a specified size in the marker image and arranging a plurality of force vector sampling points inside and outside the small region;
   calculating force vectors acting on the sampling points by supplying marker information inside the small region to a transfer function; and
   adopting force vectors acting on at least some sampling points of the plurality of sampling points arranged inside the small region.

13. The method of claim 12, wherein the sampling points are arranged densely inside the small region, and arranged sparsely with distance from the small region.

14. A method for obtaining a marker image using an optical tactile sensor comprising a tactile section having a transparent elastic body and a plurality of markers provided therein, and an imaging means for obtaining a marker image by photographing behavior of markers when an object contacts the sensing surface of the transparent elastic body, said method comprises steps of:
   providing a plurality of imaging devices as the imaging means and obtaining a partial marker image by photographing a partial region of the transparent elastic body using each of the plurality of imaging devices such that each imaging device has an overlapped imaging region; and
   forming an integrated marker image by integrating the partial marker images obtained, using the imaging means such that identical markers in the overlapped photograph regions are matched.

15. The method of claim 14 wherein said tactile portion comprises a transparent elastic body and a plurality of marker groups provided in said body, each marker group is comprised of a number of colored markers, with markers constituting different marker groups having different colors for each group, and said imaging device takes an image of behavior of colored markers when said curved surface of elastic body is contacted by an object.

16. The method of claim 14 wherein calibration of the respective imaging device is conducted using the markers.

17. A method for integrating a marker image, which is employed in an optical tactile sensor comprising a tactile section having a transparent elastic body and a plurality of markers provided therein, and a plurality of imaging devices for obtaining a marker image by photographing behavior of markers when an object contacts the sensing surface of the transparent elastic body, said image integration method comprising the steps of:

obtaining a partial image by photographing a partial region of the transparent elastic body using each of the plurality of imaging devices such that each imaging device has an overlapped imaging region; and integrating the partial images obtained using the imaging means such that identical markers in the overlapped photograph regions are matched.

* * * * *